(12) United States Patent
Kurokawa

(10) Patent No.: US 7,630,102 B2
(45) Date of Patent: Dec. 8, 2009

(54) IMAGE READING DEVICE AND METHOD

(75) Inventor: Takashi Kurokawa, Osaka (JP)

(73) Assignee: Kyocera Mita Corporation (JP)

( * ) Notice: Subject to any disclaimer, the term of this patent is extended or adjusted under 35 U.S.C. 154(b) by 201 days.

(21) Appl. No.: 11/827,762

(22) Filed: Jul. 13, 2007

(65) Prior Publication Data

US 2008/0018958 A1 Jan. 24, 2008

(30) Foreign Application Priority Data

Jul. 21, 2006 (JP) .............................. 2006-198979

(51) Int. Cl.
*H04N 1/04* (2006.01)
*H04N 1/40* (2006.01)
*H04N 1/38* (2006.01)

(52) U.S. Cl. .................. 358/474; 358/461; 358/463; 358/465; 358/496; 358/498

(58) Field of Classification Search ................ 358/461, 358/496, 498, 463, 465, 466, 437, 3.26, 474; 382/274, 275
See application file for complete search history.

(56) References Cited

U.S. PATENT DOCUMENTS

| | | | |
|---|---|---|---|
| 5,930,008 A * | 7/1999 | Nabeshima et al. | 358/496 |
| 6,563,938 B1 | 5/2003 | Harada | |
| 6,600,579 B1 * | 7/2003 | Kumagai et al. | 358/474 |
| 6,801,670 B2 * | 10/2004 | Kijima et al. | 382/274 |
| 7,212,320 B2 * | 5/2007 | Imoto | 358/497 |
| 2003/0016398 A1 * | 1/2003 | Soeda | 358/461 |
| 2005/0179954 A1 * | 8/2005 | Arai et al. | 358/3.26 |
| 2008/0018958 A1 * | 1/2008 | Kurokawa | 358/474 |

FOREIGN PATENT DOCUMENTS

| | | |
|---|---|---|
| JP | 2000-196814 | 7/2000 |
| JP | 2000-310820 | 11/2000 |

* cited by examiner

*Primary Examiner*—Cheukfan Lee
(74) *Attorney, Agent, or Firm*—Gerald E. Hespos; Anthony J Casella

(57) ABSTRACT

An image reading device reads out an image of a document being conveyed above one main surface of a contact glass, changes a document reading position if the image has an abnormality, and gives a warning if the changed document reading position is located at a predetermined reference position. The image reading device has a setting portion for changing the reference position in accordance with the number of documents that have passed the document reading position during the time when no abnormality in images is obtained by reading the documents.

4 Claims, 10 Drawing Sheets

IMAGE READING DEVICE AND METHOD

BACKGROUND OF THE INVENTION

1. Filed of the Invention

The present invention relates to an image reading device and an image reading method of so called sheet-through type of conveying a subject document above one main surface of a transparent plate and reading an image of the document from other main surface side of the transparent plate.

2. Description of the Related Art

When an image of a document is read out by using an image reading device of a sheet-through type and printed with a printer or is taken into a computer such as a personal computer to be displayed on a display, there are some cases where a linear abnormal image appears on an image along a sub-scanning direction. This is normally caused by foreign substances such as dirt, dusts or paper powders adhered to a contact glass of an image reading device, or scars left on a contact glass. Such linear abnormal image appears on a white background portion as a black line or on an image portion as a white line, and is visually eye-catching. For an image device which is desired to obtain image data truly reflecting a document, it is desired to remove such linear abnormal image.

Technologies to suppress generating of such linear image are disclosed, for example, in Japanese Unexamined Patent Publication Nos. 2000-196814 and 2000-310820, respectively.

In the technology disclosed in the Japanese Unexamined Patent Publication No. 2000-196814, a reference plate arranged extendingly in a main scanning direction is read out at a document reading position before a document is read out. Then, it is determined whether or not an abnormal image is included in the obtained image of the reference plate. If an abnormal image is included, a document reading position is moved a predetermined distance along a sub-scanning direction. Further, if an abnormal image is identified again at a new document reading position, a document reading position is further changed. The technology disclosed in the Japanese Unexamined Patent Publication No. 2000-196814 suppresses appearing of a linear abnormal image of a document read out in such manner.

Further, in the technology disclosed in the Japanese Unexamined Patent Publication No. 2000-310820, at first, a document is read out, and it is determined whether or not there is included in the final line of a document an image having a width within a predetermined range and a density equal to or higher than a predetermined density. Secondly, when it is determined that such image is included, a reference plate is read out. Then, it is determined whether or not an image of the reference plate at the position of the above-described image has a density equal to or higher than the predetermined density. Thirdly, when it is determined that the image has a density which is equal to or higher than a predetermined density, it is determined whether or not an average density of images on opposite sides of the above-described position is equal to or higher than a predetermined density. Then, when it is determined that the average density is equal to or higher than the predetermined density according to the determination, it is determined that the image is an abnormal image. Further, if an abnormal image is identified again at a new document reading position, a document reading position is further changed.

Further, in the technology disclosed in the Japanese Unexamined Patent Publication No. 2000-310820, at first, a document is read out, and it is determined whether or not a difference between respective maximum density positions in the first line and final line of the document is within a predetermined range. Secondly, when the difference is within the predetermined range, it is determined whether or not the maximum density in the final line is equal to or higher than a predetermined density. Thirdly, when the maximum density is equal to or higher than the predetermined density according to the determination, the reference plate is read out, and it is determined whether or not the maximum density of the reference plate is equal to or higher than a predetermined density. Fourthly, when the maximum density is equal to or higher than the predetermined density according to the determination, it is determined whether or not a difference between the maximum density position in the final line read out in the first step and the maximum density position of the reference plate is within a predetermined range. Then, when it is determined that the difference is within the predetermined range, it is determined that there is an abnormal image at the maximum density position. Further, if an abnormal image is identified again at a new document reading position, a document reading position is further changed.

The technology disclosed in the Japanese Unexamined Patent Publication No. 2000-310820 performs determinations successively as described above to determine foreign substances adhered to a reference plate and scars left on the reference plate which are not appeared as an abnormal image on actual image data, thereby improving an accuracy in determining foreign substances adhered to the contact glass and scars left on the contact glass.

According to the disclosures of Japanese Unexamined Patent Publication No. 2000-310820, a document reading position is changed successively from the initial document reading position to the final document reading position which are set in advance at each time when an abnormal image is identified as described above. However, when a document reading position reaches the final document reading position, it is changed in a reversed order (from the final document reading position to the initial document reading position determined in advance). At that time, a warning is given to a user to notify that it is the time for maintenance.

There is a case where dirt, dusts, paper powders and the like causing the above-described abnormal images are moved when a document passes the document reading position, and a linear abnormal image may not be generated on an image even when it is determined that there is an abnormal image. If the above-described warning is given in such a case, the warning may likely to become obtrusive, or a user may feel it burdensome if the image reading device is of a model which requires a user to perform an operation to cancel the warning. Accordingly, convenience of the image reading device is lowered. Further, if the warning is given in such a case, a user may think that the image reading device went wrong and is happened to perform an irrelevant operation. Especially when an image reading device reads a document which is likely to generate paper powders, it is likely that such warning is given frequently. Accordingly, such disadvantage is significant.

SUMMARY OF THE INVENTION

The present invention was worked out in view of the above-described circumference, and its object is to provide an image reading device and an image reading method capable of giving appropriate warnings.

An image reading device according to one aspect of the present invention changes a reading position along a sub-scanning direction when an image obtained by reading the document has an abnormality, and performs a notification when the changed document position has an abnormality. The image reading device comprises a setting portion for changing a set position in accordance with the number of documents passed through the document reading position when the images obtained by reading the documents have no abnormality. In such image reading device, a notification can be performed appropriately.

These and other objects, features and advantages of the present invention will become more apparent upon reading of the following detailed description along with the accompanied drawings.

BRIEF DESCRIPTIONS OF THE DRAWINGS

DETAILED DESCRIPTIONS OF THE PREFERRED EMBODIMENTS

Hereinafter, an embodiment of the present invention will be described with reference to the drawings. It should be noted that the arrangements provided with the same reference signs in figures indicate that they have the same arrangements, and the descriptions of those will be omitted.

Figure 1:
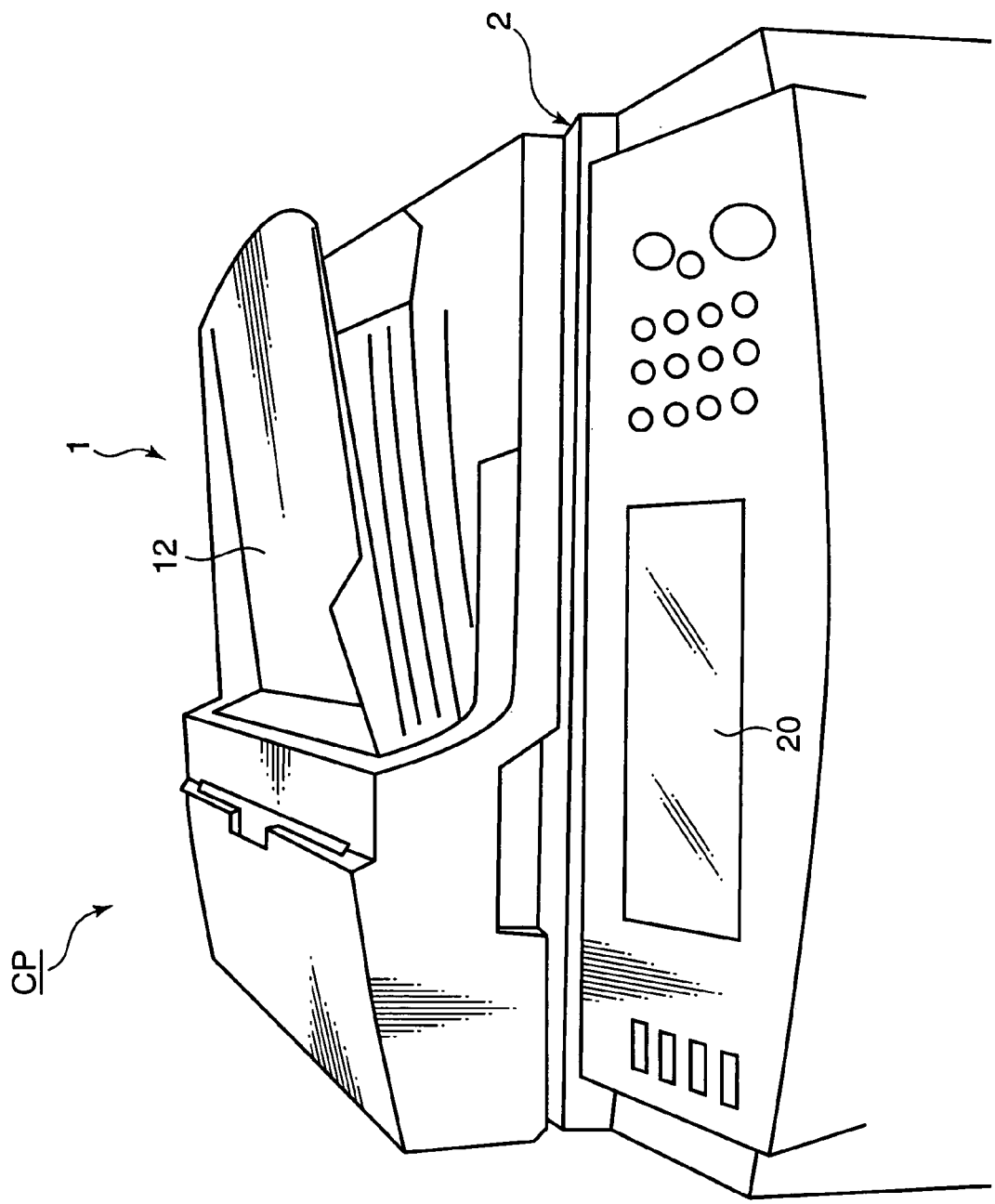
FIG. 1 is a view showing an exterior configuration of a digital copying machine of the embodiment.
Figure 2:
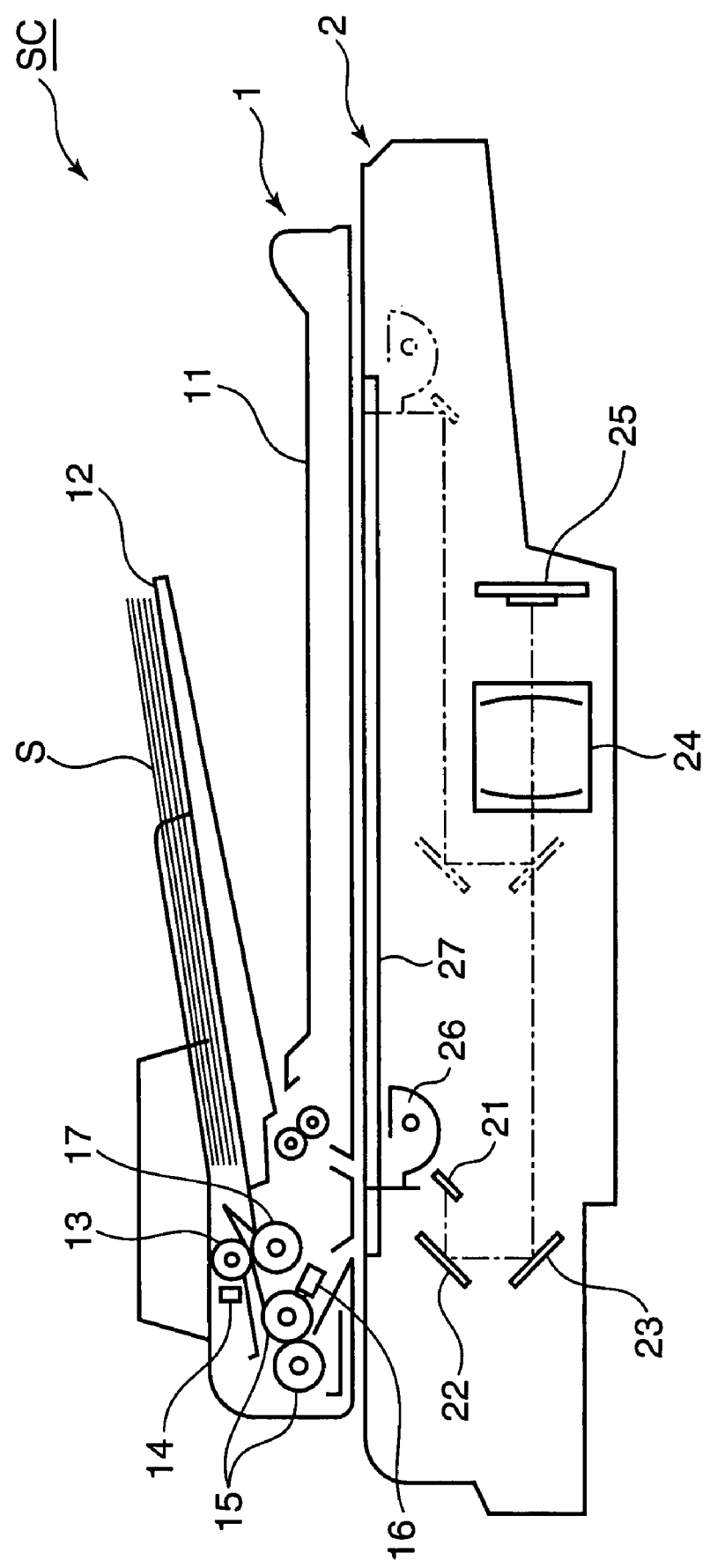
FIG. 2 is a schematic sectional view mainly showing mechanical and optical configurations of the image reading device of the embodiment.
Figure 3:
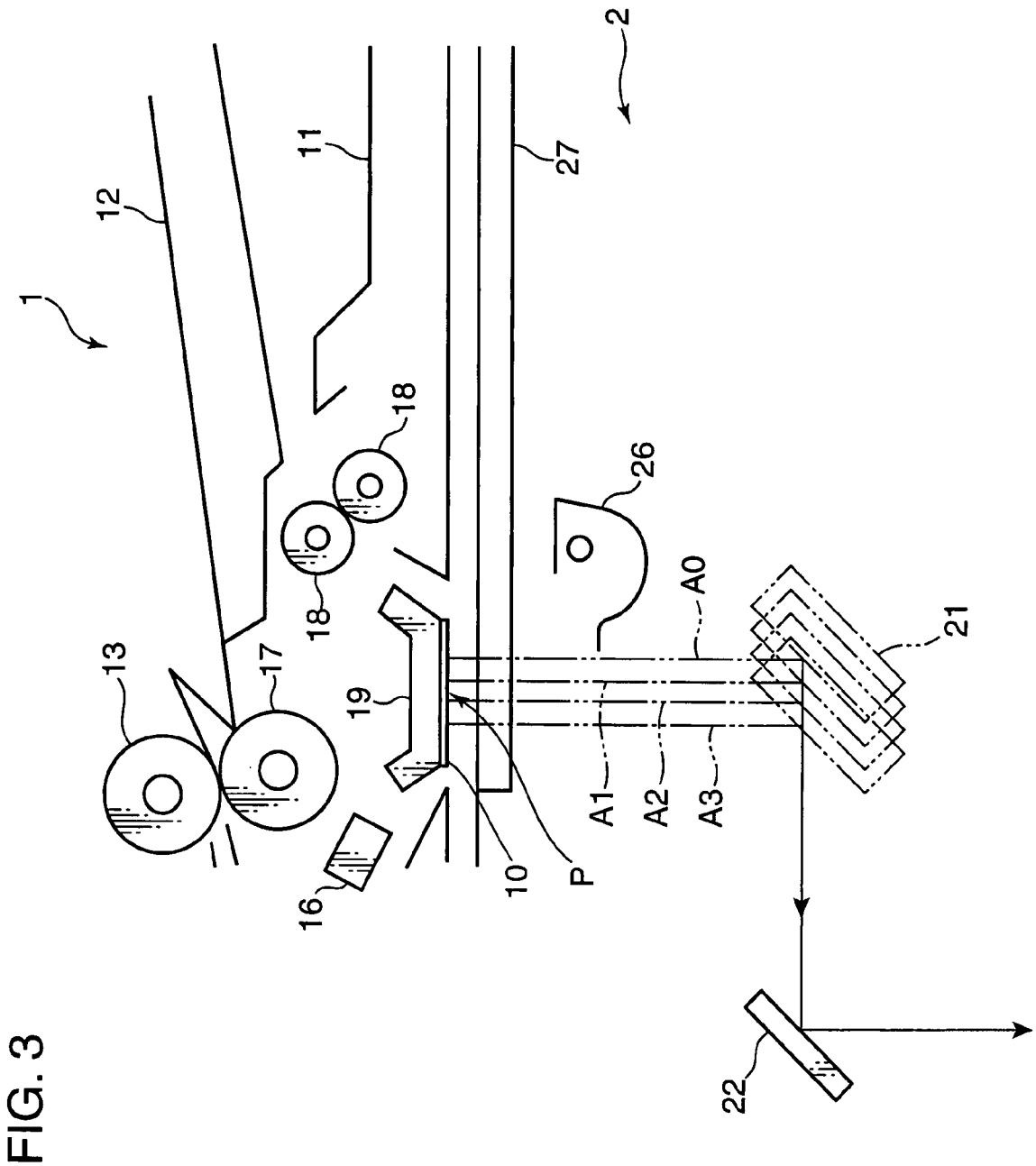
FIG. 3 is a partial enlarged view of FIG. 2.
Figure 4:
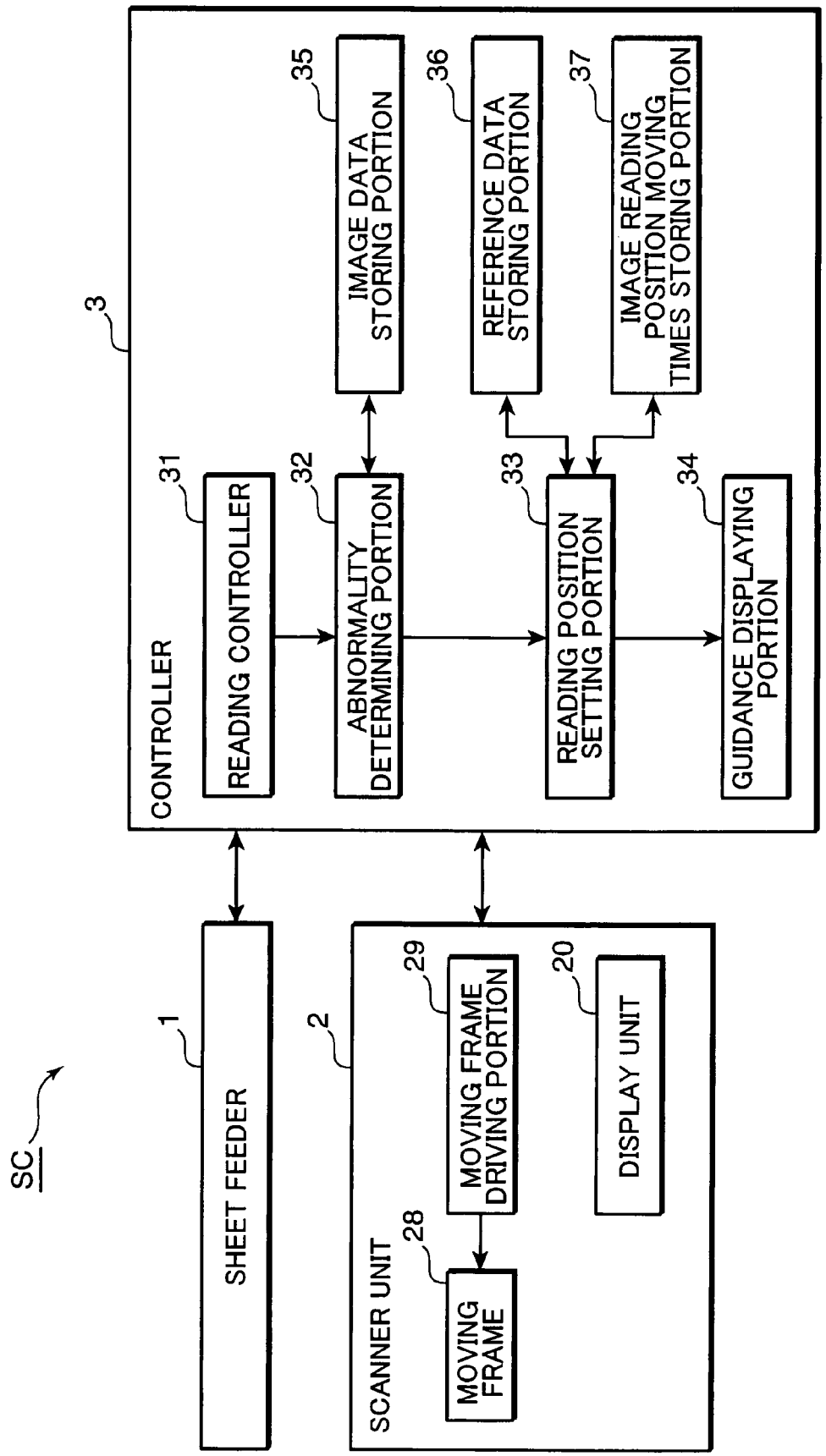
FIG. 4 is a block diagram mainly showing an electric configuration of the image reading device of the embodiment.

FIG. 1 is a view showing an external configuration of a digital copying machine of the embodiment. FIGS. 2 and 3 are figures mainly showing mechanical and optical configurations of the image reading device of the embodiment. FIG. 3 is a partial enlarged view of FIG. 2. FIG. 4 is a block diagram mainly showing an electric configuration of the image reading device of the embodiment.

In FIGS. 1 to 4, the image reading device SC is embodied as a digital copying machine CP including not only an image reading function i.e. a scanner function but also a printer function. The image reading function is a function of reading an image of a document S, which is conveyed above one main surface of a contact glass 27 in a sub-scanning direction, from other main surface side of the contact glass 27 by using reflected light of an exposure lamp 26. Here, the contact glass 27 is an example of a transparent plate, and the exposure lamp 26 is an example of a light source. Further, the image reading device SC may be embodied as a scanner, or may be embodied as a complex machine having a facsimile function, a printer function, a scanner function and the like. The image reading device SC includes a sheet feeder (document feeder) 1, a scanner unit 2 and a controller 3.

The sheet feeder 1 is adapted to convey a document to a document reading position P where the document S is read out. The sheet feeder 1 is mounted on an upper surface of the scanner unit 2 openably and closably. As shown in FIGS. 1 to 3, the sheet feeder 1 includes, for example, a reference plate 10, a document-discharging table 11, a document-feeding table 12, a sheet-feeding roller 13, a registration switch 14, a pair of registration rollers 15, a timing switch 16, a separating roller 17, a pair of sheet-discharging rollers 18 and a document-pressing member 19. The scanner unit 2 is adapted to read out an image of a document S conveyed to a document reading position P. As shown in FIGS. 1 to 3, the scanner unit 2 includes, for example, a display unit 20, a first mirror 21, a second mirror 22, a third mirror 23, a lens system 24, a CCD image-pickup device 25, the exposure lamp 26 and the contact glass 27. The controller 3 is provided in the image reading device SC (in the digital copying machine) and adapted to control the sheet feeder 1 and the scanner unit 2 in accordance with the respective functions of these. For example, the controller 3 is arranged with a microcomputer including a CPU (Central Processing Unit), a ROM (Read Only Memory) and an EEPROM (Electrically Erasable Programmable Read Only Memory) for storing in advance various programs executed by the CPU, data necessary for execution of the programs and the like, a RAM (Random Access Memory) to be so called working memory for the CPU, and a peripheral circuit.

In accordance with a control of the controller 3, one document S is separated successively with the sheet-feeding roller 13 and the separating roller 17 arranged in pair from a plurality of documents S placed on the document-feeding table 12, and conveyed by the pair of registration rollers 15 to a document reading position P set between the reference plate 10 of the document-pressing member 19 and the contact glass 27. The registration switch 14 and the registration rollers 15 are adapted to restrict oblique conveyance of the document S and align a front edge of the document before the document S is conveyed to a document reading position P. The reference plate 10 is a plate-like member extending in a main scanning direction (in a direction perpendicular to a sheet surface in FIGS. 2 and 3) and attached to a surface of the document-pressing member 19 on the side facing one main surface of the contact glass 27. The reference plate 10 has, for example, a white color at least on the surface facing the contact glass 27. The timing switch 16 is adapted to determine a leading edge timing of an image conveyed on the document. A signal obtained from the timing switch 16 is notified to the controller 3.

During when a document S is moving through a document reading position P, an image of the document S on the side facing the contact glass 27 is read out by an optical system provided in the scanner unit 2. Specifically, at first, the exposure lamp 26 emits light ray in accordance with a control of the controller 3, and the light ray emitted from the exposure lamp 26 passes through the contact glass 27 and is irradiated to a document reading position P. Consequently, light ray reflected from the document S at the document reading position P passes through the contact glass 27 and enters the first mirror 21. The incident light ray passes the second mirror 22, the third mirror 23 and the lens system 24, and thereafter enters to the CCD image-pickup devices 25. Each CCD image-pickup device 25 is operated in accordance with a control of the controller 3 and converts the incident light ray to an electric signal. The CCD image-pickup devices 25 are aligned in the main scanning direction and obtain image data for one line in the main scanning direction simultaneously. The CCD image-pickup devices 25 may be aligned in a plurality of lines so that they can obtain image data for a plurality of lines simultaneously. The image data obtained by the CCD image-pickup devices 25 is amplified and modulated to a digital signal with an unillustrated step circuit. Thereafter, the controller 3 further applies various image processings such as a shading correction, a gamma correction, a chromatic aberration correction, an MTF (Modulation Transfer Function) correction and a scanner color correction. Then, the image data applied with an image processing is stored in a predetermined memory area in a memory of the controller 3.

A document S passed a reading position P is discharged to the document-discharging table 11 by the pair of sheet-discharging rollers 18 in accordance with a control of the controller 3. During when the CCD image-pickup device 25 reads an image of the document S at a document reading position P, the document S is moved in the sub-scanning direction (a horizontal direction in FIGS. 2 and 3). Accordingly, when one sheet of document S is accommodated on the document-discharging table 11, reading of a whole image of one sheet of document S along the main scanning direction and sub-scanning direction is completed.

Here, the scanner unit 2 is so configured that an image of the document S can be read out by opening the sheet feeder 1 upward from the scanner unit 2 and placing the document S one after another on an upper surface of the contact glass 27 without using the sheet feeder 1. To achieve this object, a part of the optical system is attached to a moving frame 28 to be movable along the main surface of the contact glass 27. In other words, the exposure lamp 26, the first mirror 21, the second mirror 22 and the third mirror 23 are attached to the moving frame 28 and moved along with the movement of the moving frame 28. On the contrary to this, the lens system 24 and the CCD image-pickup device 25 are not attached to the moving frame 28 but fixed to the scanner unit 2 in a part other than the moving frame 28. Along with the movement of the moving frame 28, the second mirror 22 and the third mirror 23 are moved only a half the moving distance of the exposure lamp 26 and the first mirror 21. Accordingly, the distance of a light path of the reflected light ray from the first mirror 21 to the lens system 24 is maintained to be constant independently from a position of the moving frame 28. Along with the movement of the exposure lamp 26 and the first mirror 21, a document reading position is moved along the sub-scanning direction. Accordingly, the CCD image-pickup device 25 can read out an image of the document S statically placed on the upper surface of the contact glass 27 along the main scanning direction and sub-scanning direction.

As shown in FIG. 3, even when an image the document S is read out through the contact glass 27 while the document S is conveyed by the sheet feeder 1, the moving frame 28 is movable. Accordingly, the document reading position P in the contact glass 27 can be changed along the upper surface of the contact glass 27. Such arrangement can be easily realized by directly using the arrangement having the moving frame 28 to enable the scanner unit 2 to read also an image of the document S placed on the upper surface of the contact glass 27.

For example, to perform such image reading operation, the scanner unit 2 further includes in its electric configuration a moving frame driving portion 29 which is a circuit for moving the moving frame 28 by driving an unillustrated motor in accordance with a control of the controller 3, as shown in FIG. 4. The controller 3 functionally includes a reading controller 31, an abnormality determining portion 32, a reading position setting portion 33, guidance displaying portion 34, an image data storing portion 35, a reference data storing portion 36 and an image reading position moving times storing portion 37.

The reading controller 31 controls the sheet feeder 1 and scanner unit 2 in such a manner as described above to read an image of the document S. The abnormality determining portion 32 determines whether or not an image obtained by reading the document S includes an abnormality based on a maximum density in a predetermined area in an image of the document S and a maximum density in an image obtained by reading the reference plate 10 in the state where the document S is not placed on one main surface of the contact glass 27. When the abnormality determining portion 32 determines that there is an abnormality, the reading position setting portion 33 controls the moving frame driving portion 29 to change a document reading position P in the sub-scanning direction within a range where the reference plate 10 may be read and set a document reading position P to be at a new position. The guidance displaying portion 34 displays on a display unit 20 of the scanner unit 2 guidance to urge maintenance of the contact glass 27 based on the result of the determination of the abnormality determining portion 32 or the number of sheets of the document S passed through the sheet feeder 1. Such guidance for urging maintenance of the contact glass 27 includes a cleaning guidance to urge cleaning of the contact glass 27 at a document reading position P. The display unit 20 is provided in an upper front portion of the scanner unit 2 (digital copying machine CP), and is adapted to display not only guidance but also an operation inputted to the scanner unit 2 (digital copying machine CP), the state of operation of the scanner unit 2 (digital copying machine CP) and the like. The display unit 20 includes, for example, a liquid crystal display (LCD). The image data storing portion 35 is adapted to store image data read out from the document S by the reading controller 31. The reference data storing portion 36 is adapted to store reference data for moving a document reading position P to respective positions. In the present embodiment, for example, the reference data includes a moving distance of the document reading position P to respective positions and a timing (a document reading start timing) to start reading out the document at respective positions. The image reading position moving times storing portion 37 is adapted to store a value of the number of document reading position movement of the present document reading position P from the initial position.

Next, an abnormality determining operation of the image reading device SC will be described.

Figure 5:
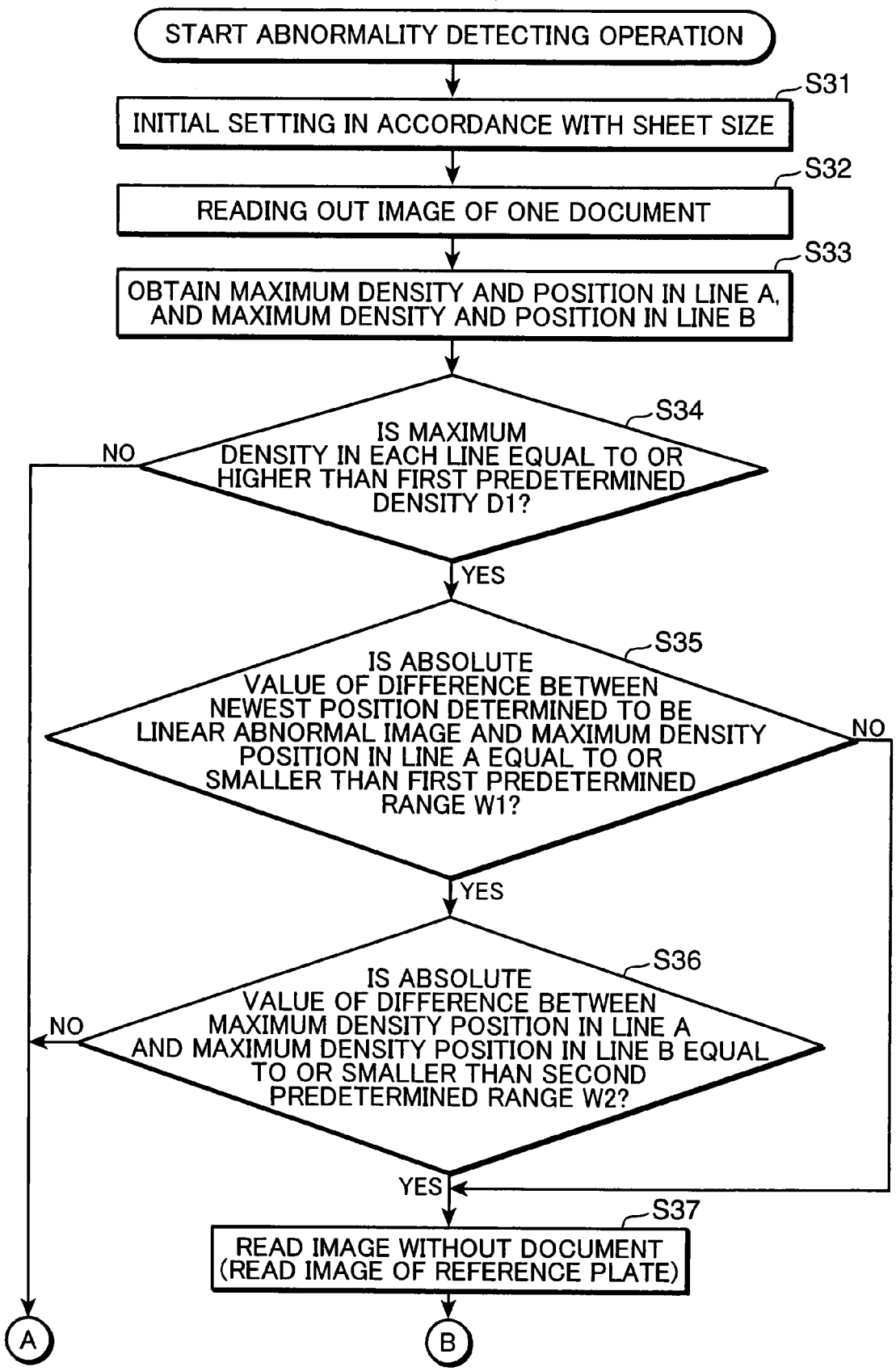
FIG. 5 is a flowchart (part 1) showing an abnormality determining operation in the image reading device of the embodiment.
Figure 6:
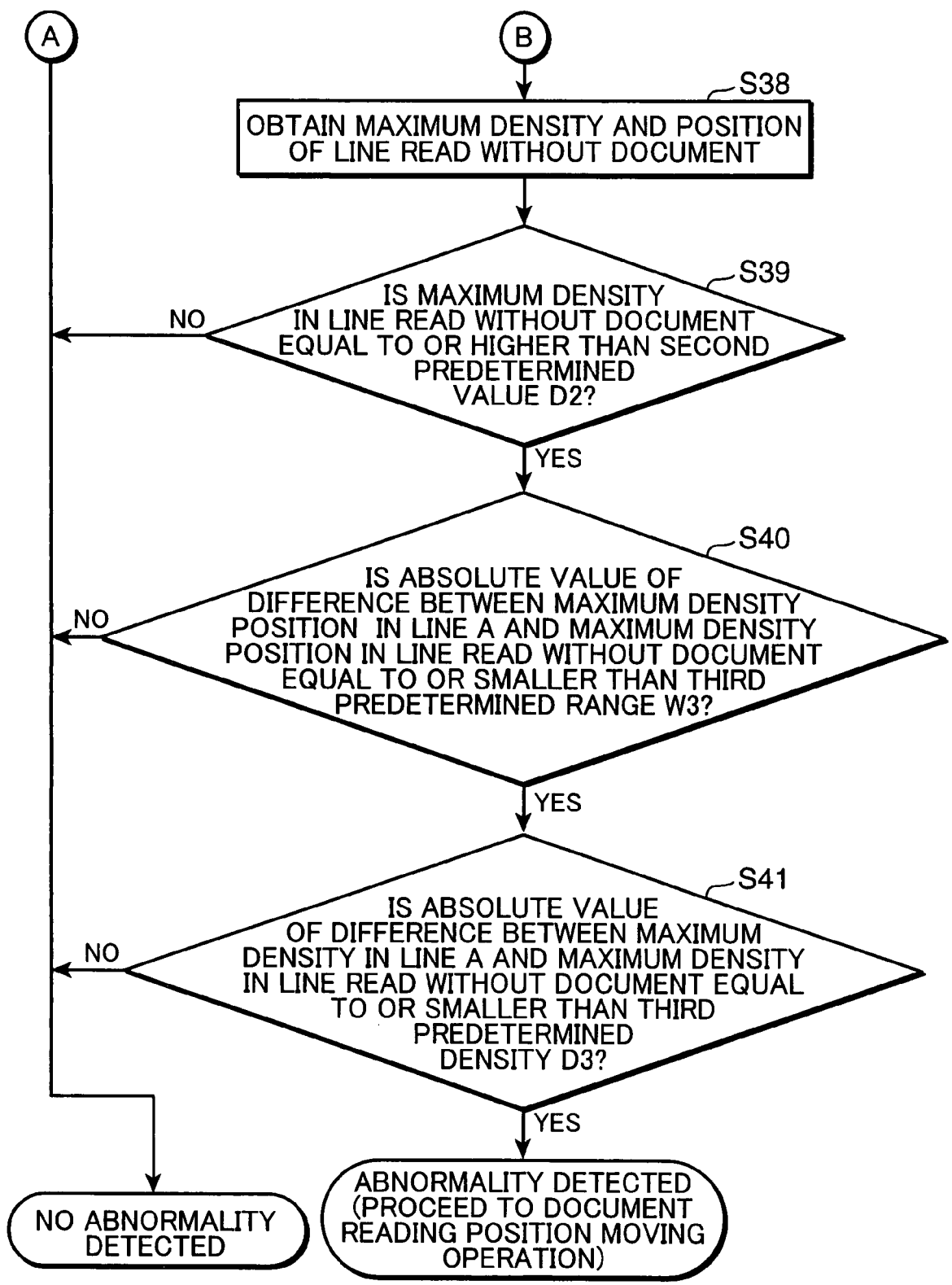
FIG. 6 is a flowchart (part 2) showing an abnormality determining operation in the image reading device of the embodiment.
Figure 7:
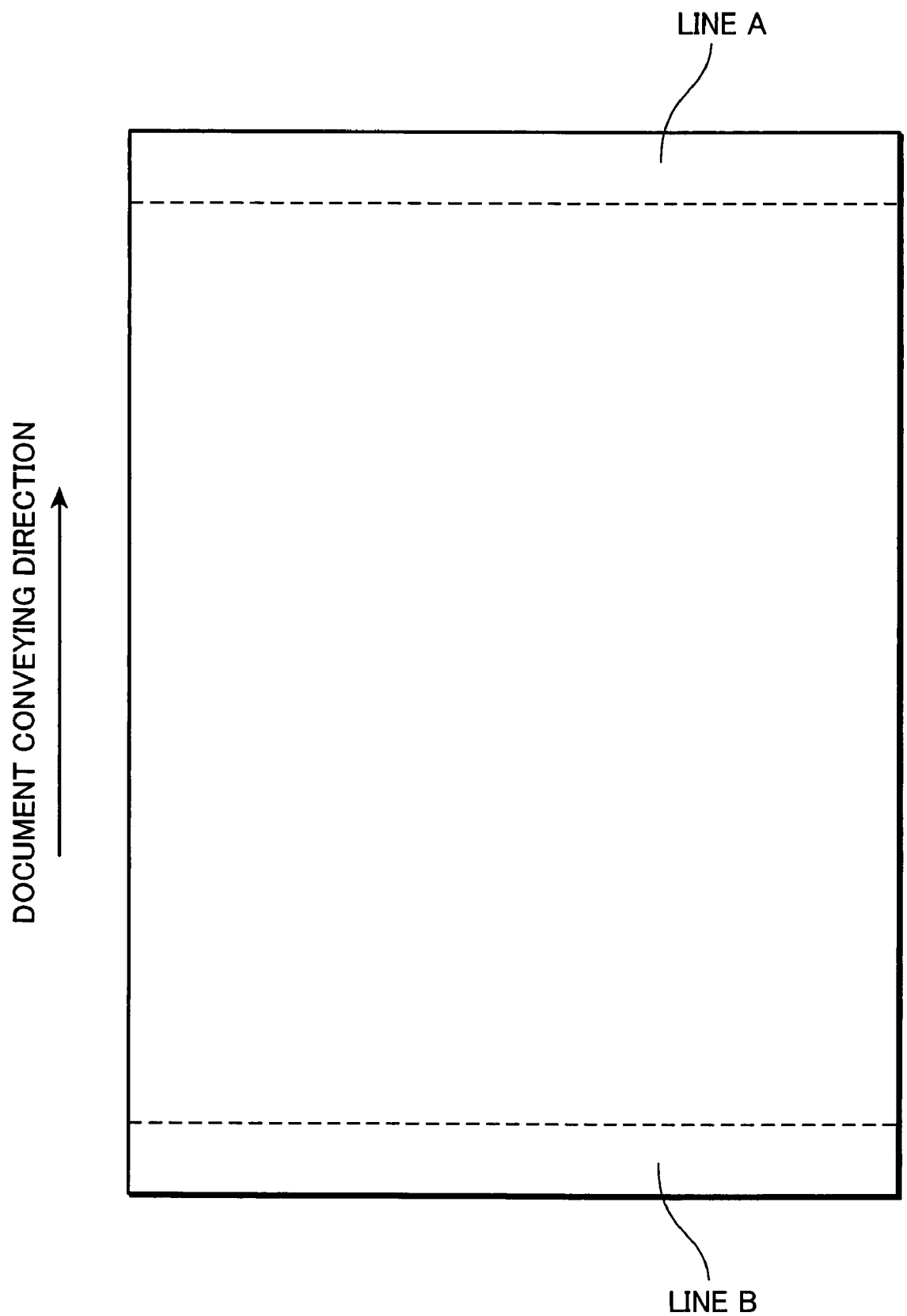
FIG. 7 is a figure for describing a document reading area.

FIGS. 5 and 6 are flowcharts showing the abnormality determining operation in the image reading device of the embodiment. FIG. 7 is a figure for describing a reading area of a document.

In FIGS. 5 and 6, the reading controller 31 of the controller 3 performs at first an initial setting corresponding to a sheet size before the abnormality determination is performed in the image reading device SC (S31). As will be described hereinafter, the abnormality determination is performed with use of image data (hereinafter, referred to as "image data of line A") obtained by reading an area (hereinafter, referred to as "line A") being a leading edge in a conveying direction of the document S and having a predetermined width set in advance in the sub-scanning direction extending in the main scanning direction, and image data (hereinafter, referred to as "image data of line B") obtained by reading an area (hereinafter, referred to as "line A") being a posterior edge in a conveying direction of the document S and having a predetermined width set in advance in the sub-scanning direction extending in the main scanning direction, as shown in FIG. 7. Therefore, in the initial setting, specifically, respective positions of the line A and line B are set in accordance with the sheet size. Each line normally has a distance corresponding to about 2 mm in the sub-scanning direction, and one line or a plurality of lines are desirably set as a predetermined width of the lines A and B.

Next, as described above, the reading controller 31 operates the sheet feeder 1 and the scanner unit 2 coordinately to read an image of the document S, and stores the image data one line after another in a predetermined storage area in the image data storing portion 35 (S32). Then, the reading controller 31 notifies the abnormality determining portion 32 that reading of an image of the document S is terminated.

Next, the abnormality determining portion 32 of the controller 3 determines from image data of the line A stored in the image data storing portion 35 a maximum density in a whole area in the main scanning direction in an image of the line A, and then obtains a maximum density and a position having the maximum density (a maximum density position), and determines from image data of the line B stored in the image data storing portion 35 a maximum density in a whole area in the main scanning direction in an image of the line B, and then obtains a maximum density and a maximum density position (S33). In the CCD image-pickup device 25, the position having a maximum density is a pixel position in the main scanning direction. Further, in the image data storing portion 35, it is an address of memory.

Next, the abnormality determining portion 32 determines whether or not a maximum density of the line A obtained in the step S33 is equal to or higher than a first predetermined density D1, and determines whether or not a maximum density of the line B obtained in the step S33 is equal to or higher than the predetermined density D1. In other words, the abnormality determining portion 32 determines whether or not the maximum densities in the respective lines A and B are equal to or higher than the first predetermined density D1 (S34).

When the maximum density in the line A and the maximum density in the line B are low, it is not considered that they are linear image such as a line or an abnormal image. Therefore, the first predetermined density D1 is set desirably in accordance with a density of a line which should be determined as a linear image such as a line or an abnormal image set in advance in accordance with a specification and the like. The first predetermined density D1 is set to be a relatively small value such as 32 in the case where there are total of 256 gradation sequences with white being 0 and black being 255.

When the maximum density in at least one of the lines (both or any one of the lines) is not equal to or higher than the first predetermined density D1 (NO) according to the result of determination in the step S34, the abnormality determining portion 32 determines that a linear abnormal image is not detected, and terminates the abnormality determining operation. On the other hand, when the maximum densities of both lines are equal to or higher than the first predetermined density D1 (YES) according to the result of determination in the step S34, the abnormality determining portion 32 executes the next step S35.

In the step S35, the abnormality determining portion 32 determines whether or not an absolute value of the difference between the position which is newly determined to have a linear abnormal image according to the result of the previous abnormality determining operation (operations of the steps S31 to S41) and the maximum density position of the line A is within a first predetermined range W1. In other words, the abnormality determining portion 32 determines whether or not the position newly determined to have a linear abnormal image according to the result of the previous abnormality determining operation (operations of the steps S31 to S41) matches with the maximum density position of the line A in a range equal to or smaller than the first predetermined range W1. The first predetermined range W1 is desirably set in accordance with a range of a line which should be determined as an abnormal image set in advance in accordance with a specification. For example, the range is set to be 0x10=16 pixels. It should be noted that 1 pixel is normally about 43.3 µm. Here, although the position newly determined to have a linear abnormal image in the step S35 is compared with the maximum density position of the line A in the descriptions above, it may be compared with the maximum density position of the line B.

When the absolute value of the difference is not equal to or smaller than the first predetermined range W1 (NO) according to the result of the determination in the step S35, the abnormality determining portion 32 skips the step S36, and the reading controller 31 of the controller 3 executes the step S37. On the other hand, when the absolute value of the difference is equal to or smaller than the first predetermined range W1 (YES) according to the result of the determination in the step S35, the abnormality determining portion 32 executes the step S36, and the reading controller 31 of the controller 3 executes the step S37 according to the result of the determination.

Here, when the absolute value of the difference is not equal to or smaller than the first predetermined range W1 according to the result of the determination in the step S35, it is determined that this is the case of scars left on the contact glass 27 or foreign substances adhered to the contact glass 27, and the step S36 is skipped.

In the step S36, the abnormality determining portion 32 determines whether or not an absolute value of the difference between the maximum density position of the line A and the maximum density position of the line B is equal to or smaller than a second predetermined range W2. The second predetermined range W2 is desirably set in accordance with a width of a line which should be determined as a linear image such as a line set in accordance with a specification. For example, the range W2 is set to be 0x10=16 pixel.

When the absolute value of the difference is not equal to or smaller than the second predetermined range W2, an image subjected to the determination is considered not to be a linear image along the sub-scanning direction but a spot image. On the other hand, when the absolute value of the difference is equal to or smaller than the second predetermined range W2, the image subjected to the determination is considered to be a linear image such as a line or an abnormal image such as a black line.

Therefore, when the absolute value of the difference is not equal to or smaller than the second step predetermined range W2 according to the result of the determination made in the step S36 (NO), the abnormality determining portion 32 determines that a linear abnormal image has not been detected, and terminates the abnormality determining operation. On the other hand, when the absolute value of the difference is equal to or smaller than the second predetermined range W2 (YES) according to the result of the determination, the abnormality determining portion 32 notifies that fact to the reading controller 31 to make the reading controller 31 of the controller 3 to execute the next step S37 to further determine whether or not the image subjected to the determination is an abnormal image.

In the above description, two lines including the lines A and B are used in view of shortening the determination time. However, three or more lines or all of the lines in the conveying direction may be used.

In the step S37, the reading controller 31 reads out one or more lines in the state where there is no document S placed between the contact glass 27 and the reference plate 10, and stores the obtained image data in a predetermined storage area in the image data storing portion 35. Then, the reading controller 31 notifies the abnormality determining portion 32 that the reading of image in the state where there is no document S is terminated. Here, the number of lines read in this case is desirably set to be the minimum numbers of lines necessary for determining an abnormal image. However, if a large number lines are read out, a storage capacity corresponding to the same would be necessary in the image data storing portion 35. Accordingly, a small number of lines would be more preferable. The number of lines read out in this case is the number which is the same as the number of lines of the line A.

Next, the abnormality determining portion 32 determines from image data of the line read out in the state where there is no document S and stored in the image data storing portion 35 a maximum density which is the density highest in a whole area in the main scanning direction of an image of the line, and then obtains the maximum density and a position having the maximum density (S38).

Next, the abnormality determining portion 32 determines whether or not the maximum density of line read out in the state where there is no document S and obtained in the step S38 is equal to or higher than a second predetermined density D2 (S39).

Figure 8:
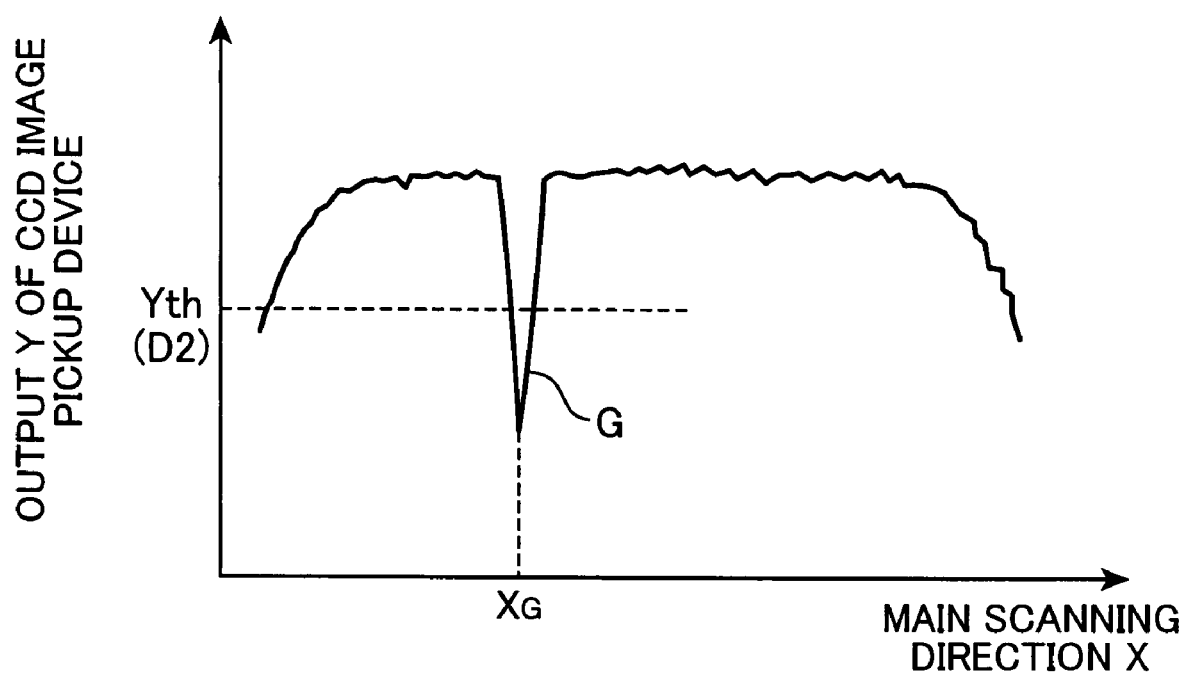
FIG. 8 is a graph showing an output of a CCD image pickup device in the case where an abnormality is included when the reference plate is read out.

FIG. 8 is a graph showing an output of a CCD image pickup device in the case where an abnormality is included when the reference plate is read out. The horizontal axis of FIG. 8 shows a main scanning direction X, and the vertical line shows an output Y of the CCD image-pickup device 25. Since the CCD image-pickup device 25 receives reflected light rays of the reference plate 10 and performs a photoelectric conversion to the light rays, a pixel value (density of pixel) becomes smaller (light) as an output Y of the CCD image-pickup device 25 becomes greater, and on the other hand, the pixel value (density of pixels) becomes larger (darker) as the output Y of the CCD image-pickup device 25 becomes smaller.

When a foreign substance having such a size larger than a predetermined size to cause a linear abnormal image along the sub-scanning direction to be appeared on an image obtained by reading the document, a deep recession G appears in a distribution along the main scanning direction X in the output Y of the CCD image-pickup device 25. Therefore, the second predetermined density D2 is desirably set in accordance with a density of a line which should be determined as an abnormal image such as a black line predetermined in accordance with a specification. The second predetermined density D2 is set to be a relatively large value such as 128 in the case where there are total of 256 gradation sequences with white being 0 and black being 255. FIG. 8 shows the output value Yth of the CCD image-pickup device 25 corresponding to the second predetermined density D2.

When the maximum density in the line is not equal to or higher than the second predetermined density (NO) according to the result of the determination in the step S39, the abnormality determining portion 32 determines that a linear abnormal image has not been detect, and terminates the abnormality determining operation. On the other hand, when the maximum density of the line is equal to or higher than the second predetermined density (YES) according to the result of the determination, the abnormality determining portion 32 executes the next step S40.

In the step S40, the abnormality determining portion 32 determines whether or not an absolute value of the difference between a maximum density position of the line A and a maximum density position of a line read out in the state where there is no document S is equal to or smaller than the third predetermined range W3. The third predetermined range W3 is set desirably in accordance with a width of a line which should be determined as a linear abnormal image along the sub-scanning direction predetermined in accordance with a specification. For example, the range W3 is set to be 160 pixels.

In the above description, the absolute value of the difference between the maximum density position of the line A and the maximum density position of the line read out in the state where there is no document S is used. However, an absolute value of the difference between a maximum density position of the line B and a maximum density position of a line read out in the state where there is no document S may be used.

When the absolute value of the difference is not equal to or smaller than the third predetermined range W3 (NO) according to the result of the determination, the abnormality determining portion 32 determines that a linear abnormal image has not been detected, and terminates the abnormality determining operation. On the other hand, when the absolute value of the difference is equal to or smaller than the predetermined range W3 (YES) according to the result of the determination, the abnormality determining portion 32 executes the next step S41 to further determine whether the linear image is an image of the document S or an abnormal image.

In the step S41, the abnormality determining portion 32 determines whether or not an absolute value of the difference between a maximum density of the line A and a maximum density of a line read out in the state where there is no document S is equal to or smaller than the third predetermined density D3. The third predetermined density D3 is desirably determined in accordance with a density of a line which should be determined as a linear image along the sub-scanning direction such as a line predetermined in accordance with a specification. A density due to paper powders and the like attached to the contact glass 27 becomes a density in accordance with a kind of paper. For example, a density tends to be relatively light in the case of a high-quality paper. Therefore, a density of a linear image such as a line on the document S is normally higher than a density due to paper powders and the like attached to the contact glass 27. Accordingly, the third predetermined density D3 is set to be a relatively large value such as 128 in the case where there are total of 256 gradation sequences with white being 0 and black being 255.

When the absolute value of the difference is not equal to or smaller than the third predetermined density D3 (NO) according to the result of the determination, it is determined that a linear image is an image of a document S such as a line, and the abnormality determining portion 32 determines that linear abnormal image has not been detected and terminates the abnormality determining operation. On the other hand, when the absolute value of the difference is equal to or smaller than the third predetermined density D3 (YES) according to the result of the determination, the abnormality determining portion 32 determines that a linear abnormal image has been detected and notifies that fact to the reading position setting portion 33 to change a document reading position P. Then, the abnormality determining operation is terminated.

As being operated in such a manner, existence or nonexistence of an abnormal image may be determined in the image reading device SC of the present embodiment. Further, when there exists in the document S a linear image such as a line along the conveying direction, erroneous determination of determining the linear image which should be determined as an image of the document S as an abnormal linear image may be reduced so that an image of the document S and an abnormal image may be assuredly discriminated.

Next, a document reading position setting operation of changing a document reading position P and displaying guidance in accordance with a result of the abnormality determining operation will be described.

Figure 9:
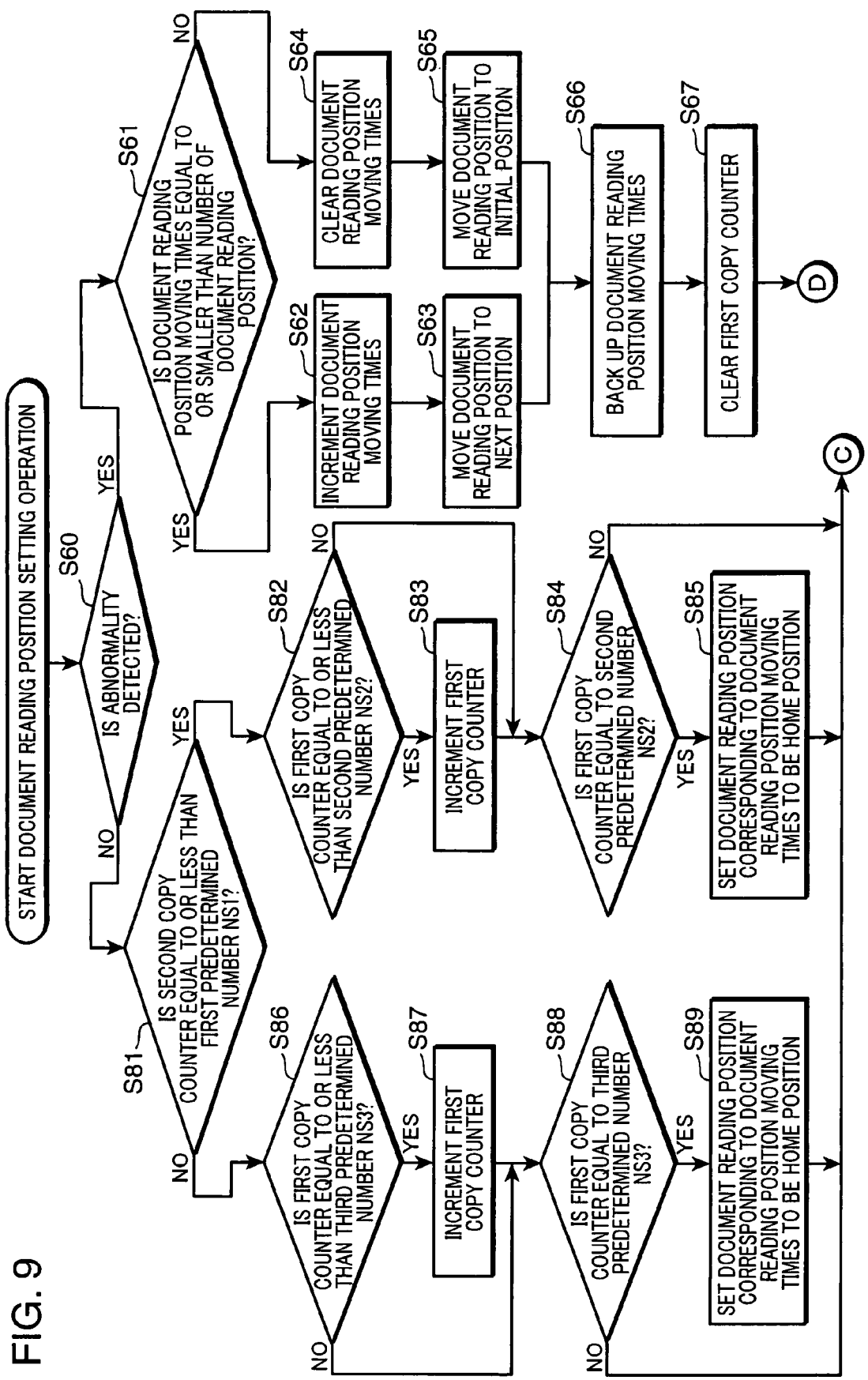
FIG. 9 is a flowchart (part 1) showing a document reading position setting operation in the image reading device of the embodiment.
Figure 10:
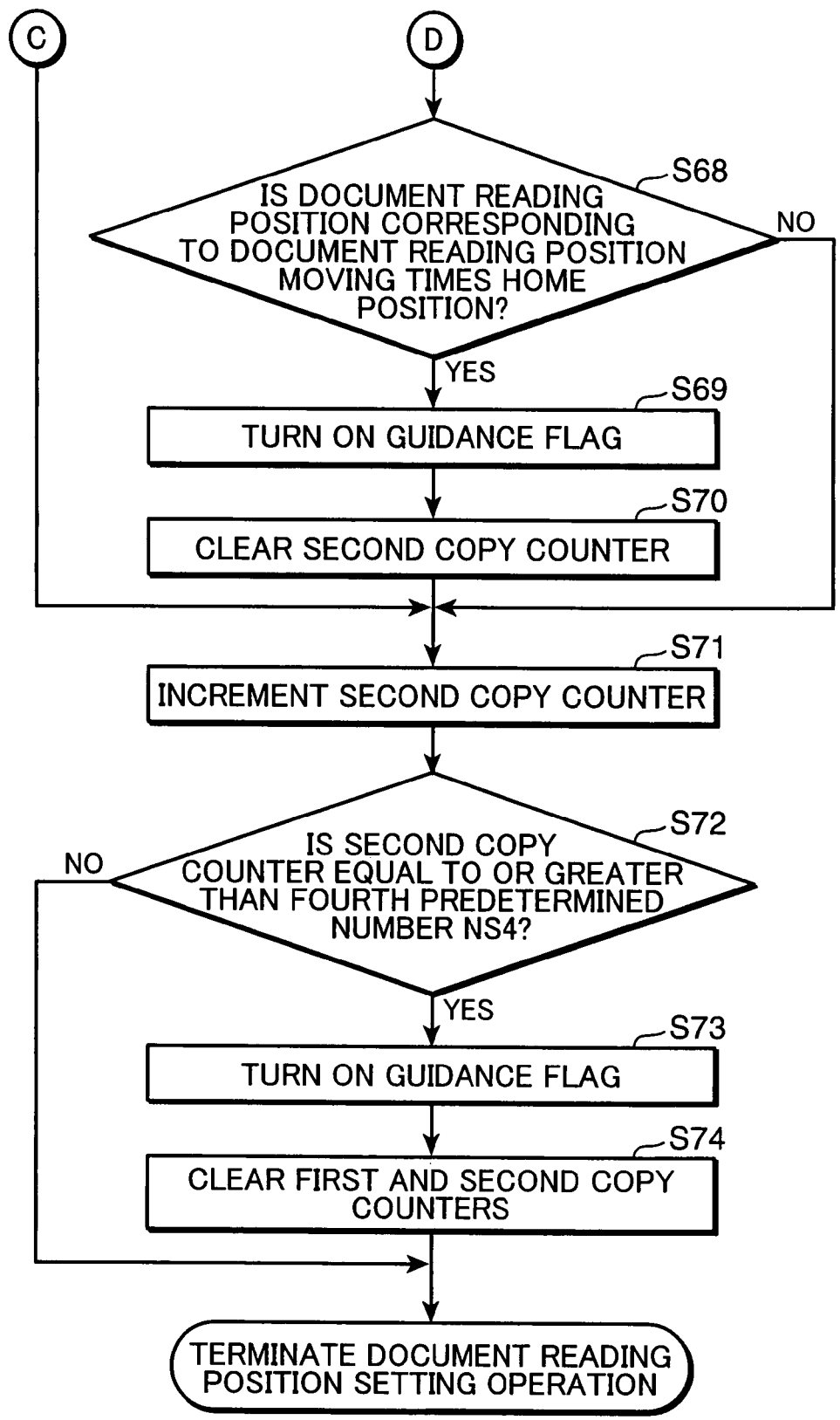
FIG. 10 is a flowchart (part 2) showing a document reading position setting operation in the image reading device of the embodiment.

FIGS. 9 and 10 are flowcharts showing the document reading position setting operation in the reading device of the embodiment.

In FIGS. 9 and 10, after the abnormality determination of the abnormality determining portion 32 in the controller 3 is terminated, the reading position setting portion 33 of the controller 3 determines at first whether or not the abnormality determining portion 32 detected an abnormality (S60) when the moving of a document reading position P in the image reading device SC and the displaying of guidance are performed.

When it is determined that a linear abnormal image is detected (YES) according to the result of the determination in the step S60, the reading position setting portion 33 determines whether or not the present document reading position moving times N is smaller than the number of document reading positions to which a document reading position P can be moved (S61). The document reading position moving times N is read out from the image reading position moving times storing portion 37 at the time of activating the image reading device SC.

For example, as shown in FIG. 3, a document reading position P is changeable to four positions along the sub-scanning direction within a range where the reference plate 10 can be read out. In the following descriptions, reference signs A0 to A3 provided to the incident light rays in FIG. 3 represent corresponding four document reading positions P. In FIG. 3, positions of the first mirror 21 corresponding to the positions A0 to A3 respectively are shown with imaginary lines of two-dotted chain lines. A spacing of the positions A0 to A3 is set to be about 0.7 mm assuming removal of effects by foreign substances having a size of about 0.6 mm. In accordance with this, a start timing for reading a document is differentiated about 37 msecs. In the example shown in FIG. 3, there are four document reading positions P. However, the number may be smaller or larger and set optionally in accordance with a specification.

When the document reading position moving times N is smaller than the number of document reading positions (YES) according to the result of the determination in the step S61, the reading position setting portion 33 increments the document reading position moving times N by 1 (S62). Specifically, the document reading position moving times N is set to be the document reading position moving times N+1 (document reading position moving times N←document reading position moving times N+1). In the present embodiment, the initial value of the document reading position moving times N is 1.

Then, the reading position setting portion 33 moves a document reading position P to the next position (S63) and executes the step S66. More specifically, the reading position setting portion 33 reads out reference data of a document reading position P corresponding to a document reading position moving times N from the reference data storing portion 36, and outputs the read reference data to the moving frame driving portion 29.

When the reference data of a document reading position P is inputted, the moving frame driving portion 29 moves the moving frame 28 in such a manner that a document reading position P is to be located at a position corresponding to the reference data. Thereby, a document reading position P is moved to the next position P.

For example, if an abnormal image is detected by the abnormality determining portion 32 when the document reading position moving times N=1, 2, 3, 4 correspond to the document reading positions P=A0, A1, A2, A3 respectively, and a present document reading position moving times N is 2, a document reading position moving times is set to be N=2+1=3. Then, a document reading position P is moved from the position A1 to the position A2 in accordance with the movement of the moving frame 28 by the moving frame driving portion 29.

On the other hand, when a present document reading position moving times N is not less than the number of document reading positions (NO) according to the result of determination in the step S61, the reading position setting portion 33 clears the document reading position moving times N to be an initial value (S64). In other words, the document reading position moving times N is set to be an initial value of 1 (document reading position moving times N←1).

Then, the reading position setting portion 33 moves a document reading position P to the initial position A0 (S65) and executes the step S66. More specifically, the reading position setting portion 33 takes out reference data of a document reading position P corresponding to a document reading position moving times N from the reference data storing portion 36 and outputs the reference data of a document reading position P to the moving frame driving portion 29 of the scanner unit 2.

When the reference data of a document reading position P is inputted, the moving frame driving portion 29 moves the moving frame 28 so as to set a document reading position P to be at a position corresponding to the reference data. Accordingly, a document reading position P is moved to the next position P.

Specifically, if the abnormality determining portion 32 detects an abnormal image when the document reading position moving times N=1, 2, 3, 4 correspond to the document reading positions P=A0, A1, A2, A3 respectively, and a present document reading position moving times N is 4, a document reading position moving times N is set to be 1. Then, in accordance with the movement of the moving frame 28 by the moving frame driving portion 29, a document reading position P is moved from the position A3 to the position A0.

In the step S66, the reading position setting portion 33 stores a present document reading position moving times N in the image reading position moving times storing portion 37. Accordingly, a present document reading position moving times N is backed up. Therefore, when a power of the image reading device SC is turned off and then turned on at the next time, the document reading position moving times N stored before the power is turned off is maintained.

If the steps S61 and S66 are executed as described above, and a linear abnormal image is detected by the abnormality determining portion 32, a document reading position P is moved successively from the initial position A0 to the final position A3. Then, if a linear abnormal image is detected by the abnormality determining portion 32 when a document reading position P is at the final position A3, a document reading position P is moved back to the initial position A0. At each time when an abnormal image is detected by the abnormality determining portion 32 as described above, a document reading position P is moved from the position A0 to the position A3 successively in a cyclic manner. Therefore, even if there are adherences of foreign substances or generation of scars on the contact glass 27, generating of a linear abnormal image may be suppressed effectively.

Then, as a next step, the reading position setting portion 33 clears a first copy counter CN1 (S67). In other words, the first copy counter CN1 is set to be an initial value of 0 (first copy counter CN1←0). In the present embodiment, the initial value of the first copy counter CN1 is 0 like a second copy counter CN2 described hereinafter. As described hereinafter, the first copy counter CN1 is incremented in the steps S83 and S87 when it is determined in an abnormality determination that an abnormal image is not detected, and is cleared in the step S67 after moving a document reading position P when it is determined in the abnormality determination that an abnormal image is detected. Thus, the first copy counter CN1 shows the number of documents S having passed through one document reading position P during when a document reading position P moves from the one document reading position P to the next document reading position P (for example, from the position A1 to the position A2). In other words, the first copy counter CN1 shows the number of documents S having passed through a document reading position P when there is no abnormal image in an image obtained by reading the document S.

Next, the reading position setting portion 33 determines whether or not a document reading position P (a present document reading position P) corresponding to a document reading position moving times N is a home position HP (S68).

When a document reading position P is not a home position HP (NO) according to the result of determination in the step S68, the reading position setting portion 33 executes the step S71. On the other hand, when the document reading position P is a home position HP (YES) according to the result of determination in the step S68, the reading position setting portion 33 turns on guidance flag GF (S69). The guidance flag GF is a flag showing whether or not a guidance displaying portion 34 should display guidance on the display unit 20. When the guidance flag GF is turned on, and the guidance flag GF is 1, the guidance displaying portion 34 displays guidance on the display unit 20, as will be described hereinafter. On the other hand, when the guidance flag GF is turned off, and the guidance flag GF is 0, the guidance displaying portion 34 does not display guidance on the display unit 20.

Next, the reading position setting portion 33 clears the second copy counter CN2 (S70). In other words, the second copy counter CN2 is set to be an initial value of 0 (second copy counter CN2←0). Then, the reading position setting portion 33 executes the step S71.

If the steps S68 to step S70 are executed as described above to detect a linear abnormal image, and a document reading position P is moved to a home position HP, guidance flag GF is turned on. Then, when the guidance flag GF is turned on, guidance is displayed on the display unit 20. As describe above, a home position HP is a reference position for determining whether or not guidance should be displayed on the display unit 20 in accordance with the movement of a document reading position P. As will be described hereinafter, the home position HP is moved in accordance with a value of the first copy counter CN1 so that display of guidance is optimized.

In the step S71, the reading position setting portion 33 increments the second copy counter CN2 by 1. In other words, the second copy counter CN2 is set to be a second copy counter CN2+1 (second copy counter CN2←second copy counter CN2+1).

Next, the reading position setting portion 33 determines whether or not the second copy counter CN2 is equal to or greater than a fourth predetermined number NS4 (S72).

When the second copy counter CN2 is not equal to or greater than the fourth predetermined number NS4 (NO) according to the result of determination in the step S72, the reading position setting portion 33 terminates the document reading position setting operation. On the other hand, when the second copy counter CN2 is equal to or greater than the fourth predetermine number NS4 (YES) according to the result of determination in the step S72, the reading position setting portion 33 turns on guidance flag GF (S73) and terminates the document reading position setting operation after clearing the first and second copy counters CN1, CN2.

If the steps S72 to step S74 are executed as described above, and the second copy counter CN2 becomes equal to or greater than the fourth predetermined number NS4, the guidance flag GF is turned on. Then, the first and second copy counters CN1, CN2 are cleared. Then, the guidance flag GF is turned on, and guidance is displayed on the display unit 20. Thus, the second copy counter CN2 shows the number of documents S having passed through a document reading position P from the one guidance to the next guidance. The second copy counter CN2 is summed until the next guidance is displayed even if a document reading position P is moved in the steps S61 to S66. Further, since the second copy counter CN2 is incremented in the step S71 as described above, it is summed up until the next guidance is displayed regardless of the detection of a linear abnormal image.

The fourth predetermined value NS is a threshold value of determining whether or not to give guidance regard less of detection of a linear abnormal image. The fourth predetermined number NS4 is desirably set in accordance with the number, at which guidance should be given regardless of detection of an abnormal image, of documents having passed a document reading position P set in accordance with a specification and the like. Normally, the amount of paper powders and the like generated on the contact glass 27 near a document reading position P increases in accordance with the number of documents having passed the document reading position P. Therefore, regardless of detection of an abnormal image, when a relatively great number of documents S has passed through a document reading position, the amount of paper powders and the like becomes great. Accordingly, it is favorable to display guidance on the display unit 20 to urge a user to clean the contact glass 27. Thus, the fourth predetermined number NS4 is set to be a relatively great value such as 2000 sheets, 5000 sheets, 10000 sheets or the like.

When the steps S72 to S74 are executed as described above, guidance is given to a user appropriately to urge removal of a relatively great amount of paper powders generated by the relatively large numbers of documents S having passed through the document reading position P.

On the other hand, when it is determined that a linear abnormal image is not detected (NO) according to the result of determination in the step S60, the reading position setting portion 33 determines whether or not the second copy counter CN2 is equal to or smaller than the first predetermined number NS1 (S81).

When the second copy counter CN2 is equal to or less than the first predetermined number NS1 (YES) according to the result of determination in the step S81, the reading position setting portion 33 determines whether or not the first copy counter CN1 is equal to or less than the second predetermined number NS2 (S82).

When the first copy counter CN1 is equal to or less than the second predetermined number NS2 (YES) according to the result of determination in the step S82, the reading position setting portion 33 increments the first copy counter CN1 by 1 (S83) and executes the step S84. On the other hand, when the first copy counter CN1 is not equal to or less than the second predetermined number NS2 (No) according to the result of determination in the step S82, the reading position setting portion 33 executes the step S84.

In the step S84, the reading position setting portion 33 determines whether or not the first copy counter CN1 is equal to the second predetermined number NS2.

When the first copy counter CN1 is equal to the second predetermined number NS2 (Yes) according to the result of determination in the step S84, the reading position setting portion 33 sets (renews) a document reading position P (a present document reading position P) corresponding to a document reading position moving times N to be a home position HP (S85) and executes the step S71. On the other hand, when the first copy counter CN1 is not equal to the second predetermined number NS2 (NO) according to the result of determination in the step S84, the reading position setting portion 33 executes the step S71.

Further, when the second copy counter CN2 is not equal to or less than the first predetermined number (NO) according to the result of determination in the step S81, the reading position setting portion 33 determines whether or not the first copy counter CN1 is equal to or less than the third predetermined number NS3 (S86).

When the first copy counter CN1 is equal to or less than the third predetermined number NS3 (Yes) according to the result of determination in the step S86, the reading position setting portion 33 increments the first copy counter CN1 by 1 (S87) and executes the step S88. On the other hand, when the first copy counter CN1 is not equal to or less than the third predetermined number NS3 (No) according to the result of determination in the step S82, the reading position setting portion 33 executes the step S88.

In the step S88, the reading position setting portion 33 determines whether or not the first copy counter CN1 is equal to the third predetermined number NS3.

When the first copy counter CN1 is equal to the third predetermined number NS3 (YES) according to the result of determination in the step S88, the reading position setting portion 33 sets (renews) a document reading position P (present document reading position P) corresponding to a document reading position moving times N (S89) and executes the above-described step S71. On the other hand, when the first copy counter CN1 is not equal to the third predetermined number NS3 (NO) according to the result of determination in the step S88, the reading position setting portion 33 executes the step S71.

Normally, paper powders and the like causing an abnormal image increases in accordance with the number of documents S having passed through a document reading position P, as described above. Therefore, in some cases of the number of documents S passed a document reading position P, the amount of paper powders and the like is relatively small, and there are relatively many cases where a linear abnormal image is not generated in an image even when it is determined that there is an abnormal image in an image. Therefore, when the number of documents S having passed a document reading position P is within a range where it is assumed that the amount of paper powders is relatively small, guidance is appropriately given to a user if a home positioned is changed while the number of documents S having passed a document reading position P in the case where it is determined that a linear abnormal image was not detected is relatively small. On the other hand, if a home position is changed when the number is beyond the range, while the number of documents having passed the document reading position P in the case where a linear abnormal image was not detected, there is a likelihood that guidance which is truly necessary is not given to a user. Therefore, the first predetermined number NS1 is set desirably in advance as the number of documents S having passed through the document reading position P within a range where it is assumed that the amount of paper powders is relatively small according to a specification and the like. For example, the first predetermined number NS1 is set to be 500 sheets, 1000 sheets, 1500 sheets or the like. Further, the second predetermined number NS2 is the number of documents S having passed the document reading position P and is equal to or less than the first predetermined number NS1. The second predetermined number NS2 is desirably predetermined to be the relatively small number according to a specification to renew a home position while the number of documents S having passed through a document reading position P in the case where it is determined that a linear abnormal image was not detected is relatively small. For example, the second predetermined number NS2 is set to be 10 sheets, 20 sheets or the like. The third predetermined number NS3 is desirably set in advance in accordance with a specification, and is a the number of document S having passed through a document reading position which is not equal to or less than the first predetermined number but greater than the second predetermined number NS2 to give guidance which is truly necessary. The third predetermined number NS3 is set to be e.g. 100 sheets and 200 sheets.

The fourth predetermined number NS4 is a value which is set for displaying guidance in accordance with the number of document S having passed through a document reading position P regardless of existence or non-existence of an abnormal image. Accordingly, it is normally set to be greater than the first predetermined number.

When it is determined that an abnormal image is not detected, the steps S81 to S85 are executed. Accordingly, when the second copy counter CN2 becomes equal to or less than the first predetermined number NS1 and the first copy counter CN1 becomes equal to the second predetermined number NS2, the home position HP is set (renewed) to be a document reading position P (present document reading position P) corresponding to the document reading position moving times N. Then, when it is determined that a linear abnormal image is detected, the first copy counter CN1 is cleared in the step S67 as described above. Thus, when the second copy counter CN2 is equal to or less than the first predetermined number NS1, if a linear abnormal image is not detected at one document reading position P, and the number of documents S having passed through the one document reading position P becomes equal to the second predetermined number NS2, the home position HP is set (renewed) to be a document reading position P (present document reading position P) corresponding to the document reading position moving times N. Therefore, if the steps S68 to S70 are executed to detect a linear abnormal image, and a document reading position P is moved to a home position HP, guidance flag GF is turned on, and guidance is displayed on the display unit 20. However, since the first and second predetermined numbers NS1 and NS2 are set to move the home position HP as described above, guidance may be displayed to a user appropriately to urge removal of paper powders.

Then, when it is determined that a linear abnormal image is not detected, the step S81, S86 to S89 are executed, and the second copy counter CN2 becomes not equal to or less than the first predetermined number NS1 but the first copy counter CN1 becomes equal to the third predetermined number NS3, the home position HP is set (renewed) to be a document reading position P (present document reading position P) corresponding to the document reading position moving times N. Then, when it is determined that a linear abnormal image is detected, the first copy counter CN1 is cleared in the step S67, as described above. Thus, when the second copy counter CN2 is not equal to or less than the first predetermined number NS1, the number of documents S with no linear abnormal image detected in one document reading position P and passed through the one document reading position P becomes equal to the third predetermined number NS3, the home position HP is set (renewed) to be a document reading position P (present document reading position P) corresponding to the document reading position moving times N. Therefore, if the steps S68 to S70 are executed to detect a linear abnormal image and the document reading position P is moved to the home position HP, guidance flag GF is turned on, and guidance is displayed on the display unit 20. However, as described above, the first and third predetermined numbers NS1, NS3 are set and the home position HP is moved. Accordingly, guidance may be appropriately displayed to a user to urge removal of paper powders.

Then, when a plurality of documents S placed on the document-feeding table 12 of the sheet feeder 1 passed through the document reading position P and all discharged to the document-discharging table 11, and reading of images of these documents S is terminated, the guidance displaying portion 34 determines whether or not the guidance flag GF is turned on. As a result of determination, when it is the case where the guidance flag GF is turned on, the guidance displaying portion 34 displays guidance on the display unit 20 and thereafter turns off the guidance flag and terminates the step of displaying guidance. On the other hand, as a result of the determination, if it is the case where the guidance flag GF is in the off-state, the guidance displaying portion 34 terminates the step of displaying guidance.

In the displaying of guidance, since the home position HP is changed as described above, guidance may be displayed appropriately to a user. Especially, even if a document S of a sheet easily causing paper powders is read out, frequency of displaying guidance is suppressed so that guidance may be displayed appropriately.

Here, the reference position in claim corresponds to the home position as an example in the present embodiment. The setting portion corresponds to the reading position setting portion 33 as an example in the present embodiment.

In the above-described embodiment, the abnormality determining portion 32 successively executed the next determinations 1 to 5 to thereby determine whether or not there exists an abnormal image in an image obtained by reading the document S. However, the abnormality determining method executed by the abnormality determining portion 32 is not limited to this. The present invention can be applied to a desired abnormality determining method. Here, the first determination is to determine whether or not respective maximum densities of a first image being an extremity end portion in a conveying direction of the document S and having a predetermined range in an area in the sub-scanning direction extending in the main scanning direction and a second image being a posterior end portion in a conveying direction of the document S and having a predetermined range in an area in the sub-scanning direction extending in the main scanning direction are equal to or higher than the predetermined density D1. The second determination is to determine whether or not an absolute value of the difference between a position having the maximum density in the first image and a position having the maximum density in the second image is equal to or smaller than the first predetermined range W1. The third determination is to determine whether or not the maximum density in the third image obtained by read out the reference plate 10 in the range in the state where the document S is not placed on one main surface of the transparent plate (contact glass 27 in the present embodiment) is equal to or greater than the second predetermined density D2. The fourth determination is to determine whether or not an absolute value of the difference between the position having the maximum density in the first or second images and the position having the maximum density in the third image is equal to or smaller than the second predetermined range W2. The fifth determination is to determine whether or not an absolute value of the difference between the maximum density in the first or second image and the maximum density in the third image is equal to or smaller than the third predetermined density D3.

For example, the present invention can be applied to the abnormality determination method disclosed in the Japanese Unexamined Patent Publication No. 2000-196814 or the abnormality determining method disclosed in the Japanese Unexamined Patent Publication No. 2000-310820 described in the Background Art.

Specifically, the present invention can be applied to the next first to third abnormality determination methods, and the reading position setting portion 33 performs the document reading position setting operation in accordance with the result of the abnormality determination. In the first abnormality determining method, the reference plate 10 positioned so as to extend in the main scanning direction a the document reading position is read out before the document S is read out. Then, it is determined whether or not there is an abnormal image according to whether or not a density which is higher than the predetermined density is included in the image obtained by reading out the reference plate 10. Then, in accordance with the result of the abnormality determination, the reading position setting portion 33 performs the document reading position setting operation.

In the second abnormality determining method, at first, the document S is read out, and it is determined whether or not there included in the final line of the document S an image which is within the predetermined range and having a density equal to or greater than the predetermined density. Secondly, when the image is included according to this determination, the reference plate 10 is read out to determine whether or not it is an image of the document S or an abnormal image. Then, it is determined whether or not an image of the reference plate 10 at the position of the image has a density which is equal to or greater than the predetermined density. Thirdly, when the image has a density which is equal to or greater than the predetermined density according to this determination, it is determined whether or not an average density of images on both sides of the above position is equal to or greater than the predetermined density. When it is determined that the average density is equal to or greater than the predetermined density, it is determined that the image is an abnormal image. Then, the reading position setting portion 33 performs the document reading position setting operation in accordance with the result of the abnormality determination.

In the third abnormality determining method, at first, the document S is read out to determine whether or not the difference between the maximum density position in the first line of the document S and the maximum density position in the final line of the document S is within the predetermined range. Secondly, when the difference is within the predetermined range according to the determination, it is determined whether or not the maximum density in the final line is equal to or greater than the predetermined density. Thirdly, when the maximum density is equal to or greater than the predetermined density according to the determination, the reference plate 10 is read out to determine whether it is an image of the document S image or an abnormal image. Then, it is determined whether or not the maximum density of the reference plate 10 is equal to or greater than the predetermined density. Fourthly, when the maximum density is equal to or greater than the predetermined density according to the determination, it is determined whether or not the difference between the maximum density position in the final line read out in the first determination and the maximum density position of the reference plate 10 is within the predetermined range. When it is determined that the difference is within the predetermined range, it is determined that there is an abnormal image at the maximum density position. Then, the reading position setting portion 33 performs the document reading position setting operation in accordance with the result of the abnormality determination.

Also with the first to third abnormality determining methods, guidance is appropriately displayed to a user since the home position HP is moved as described above in the displaying of guidance.

Then, in the above-described embodiment, reference data corresponding to the respective positions A0 to A3 of the document reading position P are calculated in advance and stored in the reference data storing portion 36. However, the moving distance and the reading start timing of a document may be calculated with a predetermined formula when a document reading position P is moved. Alternatively, a desirable position may be selected randomly.

Further, in the above-described embodiment, the program executed by the controller 3 can be supplied via a recording medium such as a ROM or a CD-ROM, or can be supplied through a transfer medium such as a network. The transfer medium is not limited to a wired transfer medium but may be a wireless transfer medium. Further, the transfer medium includes not only a communication path but also a relaying device for relaying communication path such as a router.

When the program is supplied through a ROM, the ROM storing the program is mounted to the controller 3 so that the controller 3 can execute the same. When the program is supplied through a CD-ROM, the program can be executed by the controller 3 by connecting a CD-ROM reading device and temporarily storing the program in an HDD. Further, when the program is supplied through a transfer medium, the controller 3 can execute the program by temporarily storing the program received via network to an HDD.

The present specification discloses various inventions as described above. Hereinafter, main inventions are described.

An image reading device according to the first aspect reads out an image of a document being conveyed above one main surface of a transparent plate in a sub-scanning direction from the other main surface of the transparent plate by emitting light rays from a light source and receiving light rays reflected from the document, changes a document reading position along the sub-scanning direction if an image obtained by reading the document has an abnormality, and gives a warning if the changed document reading position is located at a predetermined reference position. The image reading device includes a setting portion for changing the reference position in accordance with the number of documents having passed the document reading position during the time when no abnormality is in the images obtained by reading the documents. Further, a method for reading an image of a document according to the second aspect includes reading an image of a document being conveyed above one main surface of a transparent plate in a sub-scanning direction from the other main surface of the transparent plate by emitting light rays from a light source and receiving light rays reflected from the document, changing a document reading position along the sub-scanning direction if an image obtained by reading the document have an abnormality, and giving a warning if the changed document reading position is located at a predetermined reference position. The reference position is changed in accordance with the number of documents having passed the document reading position during the time when no abnormality is in the images obtained by reading the documents.

According to such arrangement, the setting portion changes the reference position for determining whether or not a warning is given in accordance with the number of documents having passed the document reading position during the time when no abnormality is in images obtained by reading the documents. Accordingly, an appropriate warning can be given to a user.

With regard to the above-described image reading, the setting portion sets a present document reading position as the reference position when the number of documents having been read from one warning to next warning is less than a first predetermined number, and the number of documents having passed the present document reading position reaches a second predetermined number, and when the number of documents having been read from the one warning to the next warning is not less than the first predetermined number and the number of documents having passed the present document reading position reaches a third predetermined number different from the second predetermined number.

Paper powders causing an abnormal image are normally increased in accordance with the number of documents passed a reading position of a document. Therefore, depending upon the number of documents passed through a reading position of a document, the amount of paper powders is small. Accordingly, there are relatively many cases where a linear abnormal image is not generated in an image even when it is determined that there is an abnormal image in an image. According to such arrangement, when the number of documents having passed from one warning to next warning is less than a the first predetermined number, and the number of documents having passed the predetermined document reading position reaches the second predetermined number, a present document reading position is set as the reference position. When the number of documents having been read from the one warning to the next warning is not less than the first predetermined number and the number of documents having passed the present document reading position reaches a third predetermined number different from the second predetermined number, a present document reading position is set as the reference position. Therefore, when the amount of paper powders is in a range where the number of documents is less than the first predetermined number considered to have a relatively small amount, and the number of documents passed a present document reading position is the second predetermined number, the present document reading position is set as the reference position. Accordingly, irrelevant warning is suppressed so that an appropriate warning to a user is made possible. Further, when the number of documents is not less than the first predetermined number, and the number of documents having passed the present document reading position reaches the number different from the second predetermined number, such as the third predetermined number greater than the second predetermined number, the present document reading position is set as the reference position. Accordingly, irrelevant warning is suppressed, and a necessary warning in accordance with increase in paper powders is performed. Accordingly, an appropriate warning to a user is made possible.

Further, with regard to the above-described image readings, a warning is given when the number of documents having been read from the one warning reaches a fourth predetermined number greater than the first predetermined number.

When documents passes a document reading position further beyond the first predetermined number, paper powders increase. According to such arrangement, when the number of documents passed through the document reading position is greater than the fourth predetermined number, a warning is given. Accordingly, to urge removal of paper powders, an appropriate warning to a user is made possible.

This application is based on Japanese Patent application serial No. 2006-198979 filed in Japan Patent Office on Jul. 21, 2006, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image reading device which reads out an image of a document being conveyed above one main surface of a transparent plate in a sub-scanning direction from the other main surface of the transparent plate by emitting light rays from a light source and receiving light rays reflected from the document, changes a document reading position along the sub-scanning direction if an image obtained by reading the document has an abnormality, and gives a warning if the changed document reading position is located at a predetermined reference position, the image reading device comprising:

a setting portion for changing the reference position in accordance with the number of documents having passed the document reading position during the time when no abnormality is in images obtained by reading the documents.

2. The image reading device according to claim 1, wherein the setting portion sets a present document reading position as the reference position when the number of documents having been read from one warning to next warning is less than a first predetermined number, and the number of documents having passed the present document reading position reaches a second predetermined number, and when the number of documents having been read from the one warning to the next warning is not less than the first predetermined number and the number of documents having passed the present document reading position reaches a third predetermined number different from the second predetermined number.

3. The image reading device according to claim 2, wherein a further warning is given when the number of documents having been read from the one warning reaches a fourth predetermined number greater than the first predetermined number.

4. A method for reading an image of a document, comprising reading an image of a document being conveyed above one main surface of a transparent plate in a sub-scanning direction from the other main surface of the transparent plate by emitting light rays from a light source and receiving light rays reflected from the document, changing a document reading position along the sub-scanning direction if an image obtained by reading the document have an abnormality, and giving a warning if the changed document reading position is located at a predetermined reference position, wherein the reference position is changed in accordance with the number of documents having passed the document reading position during the time when no abnormality is in the images obtained by reading the documents.

* * * * *